United States Patent [19]

Toler

[11] 4,056,779

[45] Nov. 1, 1977

[54] VEHICULAR REPEATER

[75] Inventor: Robert Lee Toler, Plantation, Fla.

[73] Assignee: Motorola, Inc., Schaumburg, Ill.

[21] Appl. No.: 673,841

[22] Filed: Apr. 5, 1976

[51] Int. Cl.[2] .......................................... H04B 7/20
[52] U.S. Cl. ........................................ 325/4; 325/5; 325/57
[58] Field of Search ................... 343/6.8; 325/3, 4, 5, 325/6, 8, 9, 10, 16, 57

[56] References Cited

U.S. PATENT DOCUMENTS

| 3,699,443 | 10/1972 | Weger | 325/6 |
| 3,745,462 | 7/1973 | Trimble | 325/57 |
| 3,955,140 | 5/1976 | Stephens et al. | 325/57 |

Primary Examiner—Benedict V. Safourek
Attorney, Agent, or Firm—Margaret Marsh Parker; James W. Gillman

[57] ABSTRACT

In a two-way communications system involving portable-mobile-base station transmission, a priortization method prevents interference caused by more than one mobile repeater at a single location relaying simultaneously, or by a lowband transmission skipping in from another location. When a repeater enters the system at a location, it monitors the base and portable channels, and if there is transmission activity on either channel it goes to a non-priority state. If there is no activity, a silent carrier burst is momentarily transmitted on the base channel, then the repeater goes to a non-priority state. Unless a repeater at the scene is in the priority state, each other mobile unit, upon detecting the burst, begins to repeat it out on the portable channel. When interrupted by its interrupt clock, the repeater listens for a short interval on the portable channel and if any transmission is heard, remains inhibited or in "receive" mode. The last mobile repeater to be interrupted will, of course, hear no other transmission and will return to "transmit". This unit will be established as the only unit in the priority state at that location. Any portable channel transmission will prevent base channel transmission from being repeated out on the portable channel, thus a portable-to-portable or portable-to-base transmission will have priority over base-to-portable or "skipped-in" transmission. When the unit in priority leaves or switches channels it is removed from the priority state and transmits a momentary silent carrier burst so that a new priority unit is established as before.

23 Claims, 4 Drawing Figures

VEHICULAR REPEATER

BACKGROUND OF THE INVENTION

This invention relates to the field of two-way base-mobile-portable communications systems and more particularly to the prevention of repeater interference by the establishment of a "priority" repeater.

The use of two-way radio communications between base and mobile units for police, fire-fighting, forestry departments and the like is well known in the art. The problems caused by the need to return to the vehicle before giving or receiving information are also well known and have led to the widespread use of portable units which can be carried easily upon the person of the user. These latter units are generally low power transceivers which rely upon a mobile unit to repeat out with greater power on a different channel when communication with the base station is required. When a number of mobile units converge on a location, as is frequently the case in emergency situations, interference becomes a problem since each of the mobile units hears each portable transmission and repeats it out to the base. Each mobile unit would also repeat out any base station channel transmission received, including signals "skipped-in" from a distance. Among the partially successful attempts to solve the interference problem was the use of a subaudible tone code superimposed on the carrier signal wherein each mobile-portable pair would have its own code and would communicate only with its matching unit and with the base station. This solved part of the interference problem but care had to be exercised to keep matched pairs together, and if one unit was disabled its mate was useless and the vehicle was partially disabled as well. Another solution was to have the dispatcher coordinate all transmission in an area, allowing only one transmission at a time but this was a complicated and troublesome procedure.

A further solution may be found in an improved system as set forth and disclosed in a co-pending application, Ser. No. 590,006, and, assigned to the same assignee as the present invention, in which each vehicle contains a mobile transceiver, including a repeater, as well as a portable unit. In this system, each mobile unit arriving at a location would normally assume priority over all other mobile units present by transmitting a carrier burst which would cause each other unit to up-count (or further delay) its repeater. This would produce a prioritized stack of repeaters, ideally having one repeater in each incremental delay state beginning at zero. If, when a mobile arrived, there was already repeating in progress, that mobile would up-count its own repeater to the highest possible incremental delay state. Since there were possibilities of having more than one unit in a given state, and/or some states vacant, there remained the possibility for brief, random delay before a message would be repeated out.

SUMMARY OF THE INVENTION

It is therefore an object of the invention to provide an improved scheme of prioritization for a two-way communications system wherein vehicular repeaters are utilized.

It is a particular object to eliminate random delays from the repeater function and to prevent interference caused by duplicate repeating out. It is another particular object to prevent "skipped-in" signals from blocking portable transmission.

It is still another particular object to give portable-to-portable transmission precedence over all other transmission and to give portable-to-base transmission precedence over base-to-portable transmission.

For best understanding of the description of the invention, three terms should be defined as used herein. "Inhibited" here means "held in the 'receive' mode," or "not enabled to transmit." "In priority" or "priority state" means that the unit referred to is the unit which will transmit with no delay beyond attack times, other conditions allowing transmission. "Non-priority" means that the unit referred to cannot, under any circumstances, transmit sooner than a given delay period. If, at the end of that period, a transmission is required, and no contraindicating transmission is being received, that unit will transmit and will assume the priority state.

The two-way system in accordance with a preferred embodiment of the invention includes a base station and a multiplicity of mobile units communicating on a first frequency. Each mobile unit is mounted in a vehicle and includes a portable unit which can be plugged in for charging. When the operator leaves the vehicle, the portable unit can be detached and carried on his person. When the portable unit is detached, it operates as a low power transceiver, operating at a second frequency and communicating with a repeater unit which is coupled to the mobile unit and is activated by the removal of the portable. When the portable unit is detached, the user can communicate with any other nearby portable without his communication being repeated out on the first frequency. If, however, he wishes to talk to the base station, he activates a continuous tone control squelch system (CTCSS) code which is added to his audio information. All portables in the system have the same CTCSS code. When a sensing circuit in the priority repeater detects the presence of the CTCSS code, the received audio information is coupled to the mobile unit for transmission to the base station.

When the priority repeater receives a transmission on the first or base station frequency in the absence of a second frequency transmission it repeats out the received information to all nearby portable units on the second frequency. This repeater function is enabled by removing the portable from the mobile unit, whereupon the mobile and portable channels are monitored. If any activity is heard, the repeater unit goes to the non-priority state, assuming that another repeater has priority. If no activity is heard, the mobile unit transmits a short burst of silent carrier transmission on the base channel. Each other mobile unit in the area receives that transmission and repeats it out on the portable channel until an integral interrupt clock switches the repeater to "receive" for about a 2 millisecond window. If, during this window, it detects any portable channel activity, that unit remains inhibited, i.e., in "receive" mode. The last unit of the group to be interrupted by its interrupt clock will hear no activity on the portable channel, so will return to "transmit" mode and will be the priority unit until it leaves the area. Before it leaves, it transmits a silent carrier burst when its portable is reinserted in the mobile unit. Reprioritization then takes place immediately among the units remaining at the location, not waiting for the next transmission of information.

In the usual method of operation in a Police Department the first man, or team, to arrive at the scene of any emergency operation is nominally in charge and is expected to be the "clean-up" man, last to leave the scene. Therefore, it is desirable for his repeater to assume the priority state when he arrives and maintain it until he leaves. Thus there is never a time when priorities are changing or transmissions are delayed unless the priority unit fails.

DESCRIPTION OF THE PREFERRED EMBODIMENT

Figure 1:
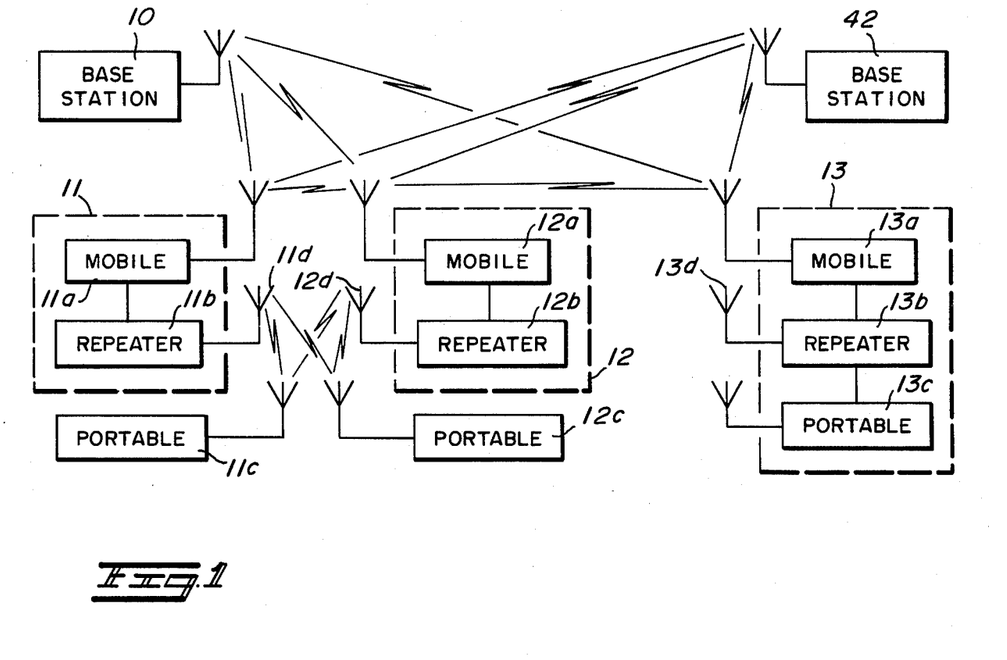
FIG. 1 is a block diagram of a two-way communications system which includes vehicular repeaters.

In FIG. 1 a block diagram shows the basic elements and lines of communication of a two-way radio communications system which embodies the invention. Base station 10 is here assumed to be the local station and can transmit to and receive from mobiles 11a, 12a or 13a, each of which is in one of the vehicles 11, 12 or 13 (indicated by dashed lines). Also forming a part of each vehicular installation is a corresponding portable 11c, 12c or 13c. When the radio operator is in his vehicle his portable is normally plugged into his mobile unit as shown in vehicle 13. His communications then are in the conventional mobile-base manner. Typically, recharging a portable takes place whenever it is physically plugged into the mobile. When the operator of vehicle 13, for example, wishes to leave the vehicle but remain able to communicate with base station 10 and with the other units in his immediate area, such as vehicles 11, 12, his portable unit 13c will serve as a low power transceiver working with that mobile/repeater unit which is in the priority state.

In accordance with the principles of the present invention, highest precedence is given to any portable unit wishing to communicate with a nearby portable. Experience has shown that in emergency situations such as law enforcement and fire-fighting, communications between personnel on the scene have the greatest urgency. Next most urgent are usually communications from the man on foot back to the base station. Therefore, the repeaters are designed to be inhibited from repeating out on the portable channel a communication from the base station channel if any portable channel transmission is being received. The repeaters are inhibited in both directions if a portable wishes to talk to another portable, but when a portable indicates by the use of the CTCSS code on its signal that its communication is to be repeated out, the priority repeater ignores any transmission received on the base channel and couples the received portable channel information to its mobile transmitter for transmission at higher power back to the base station.

Figure 2:
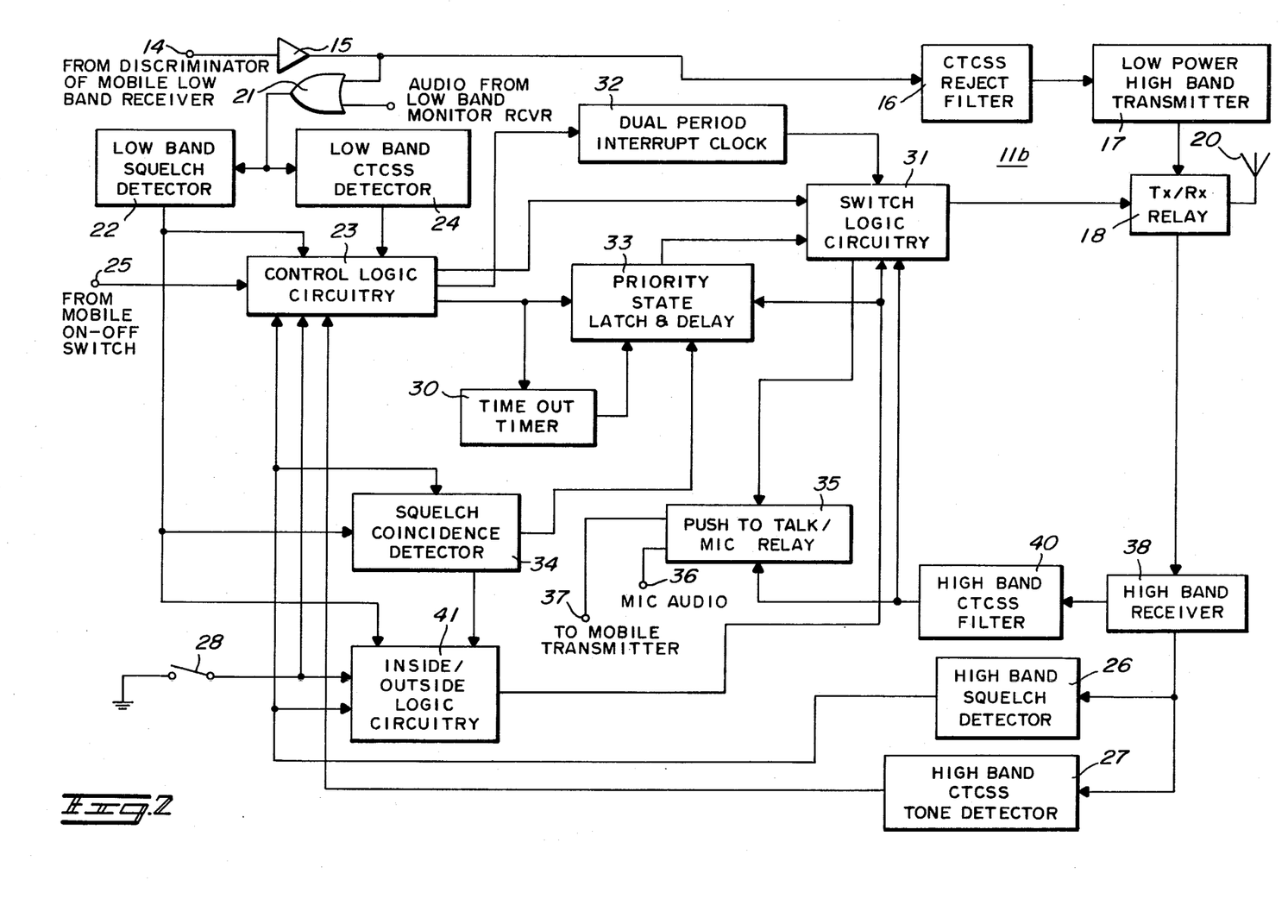
FIG. 2 is a block diagram of one of the repeaters of FIG. 1.

In the block diagram of FIG. 2, the receiver of a mobile unit, e.g. mobile 11a, supplies to a terminal 14 of the repeater 11b audio information received on the base station channel. In the preferred embodiment, this channel will be a lowband (LB) channel, although the invention is not limited thereto. After passing through a buffer amplifier 15, the signal takes two paths, one being through a CTCSS reject filter 16 which removes a CTCSS code if one is present on the signal. This use of a CTCSS code will be discussed hereinafter in the explanation of T14–T17 of FIG. 3. The audio from the output of the filter 16 is coupled to the input of a low power HB transmitter 17 which is also coupled to a transmit/receive relay 18 and, in the appropriate circumstances, to an HB antenna 20. The transmitter 17 typically operates at one quarter watt (range about 0.4 miles or 0.3 kilometers) in urban areas, at 2.5 watts for forestry work, and on a different channel or band than the base channel. This channel, which is that used by the portable units when detached will be termed a highband 11c channel in this embodiment.

The second output of the audio from the LB channel is through an OR gate 21. A second signal could be coupled to the OR gate 21 from a monitor receiver operating at a third frequency if the mobiles in the system transmit and receive on two different LB frequencies. This two frequency simplex function is only relevant to the invention in that reception on either LB channel would output the OR gate 21. The first received LB signal is coupled to an LB squelch detector 22 which outputs to a control logic circuit 23. Since CTCSS code may, under certain circumstances, be used on the LB channel also, an LB CTCSS detector 24 may also be coupled between the OR gate 21 output and the logic circuit 23. A terminal 25 couples the on-off switch (not shown) of the mobile unit to the control logic 23 for enabling and disabling the repeater. Other inputs to the control logic 23 come from an HB squelch detector 26, an HB CTCSS detector 27, and an inside-outside switch 28.

The inside-outside switch 28 is preferably located in or near the charging socket for the portable unit 11c and would be actuated by the insertion or removal of the portable unit. A time out timer TOT 30 is a timing circuit, required by law in certain circumstances, which will not allow a unit to remain in transmit mode for more than a given period, e.g. two or three minutes. Since a typical transmission on two-way channels lasts only a few seconds, a lengthy transmission would probably indicate an error condition. The TOT 30 would inhibit the transmitter and cause the unit to leave the priority state. If the lengthy transmission had been a valid one, requiring continued transmission, following the 300 millisecond delay the unit could assume priority and continue the transmission.

The control logic circuitry 23 outputs to switching logic circuitry 31 and to an interrupt clock 32 which also couples to switching circuitry 31. A third output of the control circuitry 23 is coupled to the TOT 30 and to a priority state latch and delay 33. The TOT also outputs to the latch 33. A squelch coincidence detector 34 has inputs from the LB squelch detector 22 and the HB squelch detector 26. An output of the squelch coincidence detector 34 is coupled to the priority latch 33. The priority latch output is coupled to switch logic circuitry 31. The control logic circuitry 23 also inputs to a PTT/mic relay 35. The switch logic circuitry 31 outputs to the Tx/Rx relay 18 and to the PTT/mic relay 35 which is coupled to a "mic audio" terminal 36 and to an input terminal 37, both terminals connected to the associated mobile apparatus. When an HB transmission is received by the antenna 20 it is coupled through the relay 18 to receiver 38. The received audio signal passes through an HB CTCSS reject filter 40 which couples the filtered audio to the switch logic circuitry 31 and to the PTT/mic relay 35 for transmission by the mobile on LB. The output of HB receiver 38 is also coupled to the HB squelch detector 26 and the HB CTCSS detector 27. The HB squelch detector and the inside/outside switch 28 are coupled to inputs of an inside/outside logic circuitry 41, the output of which is coupled to an input of the switching logic circuitry 31 and an input of the priority latch 33. Another input to the logic circuitry 41 comes from the control logic circuitry 23.

Figure 3:
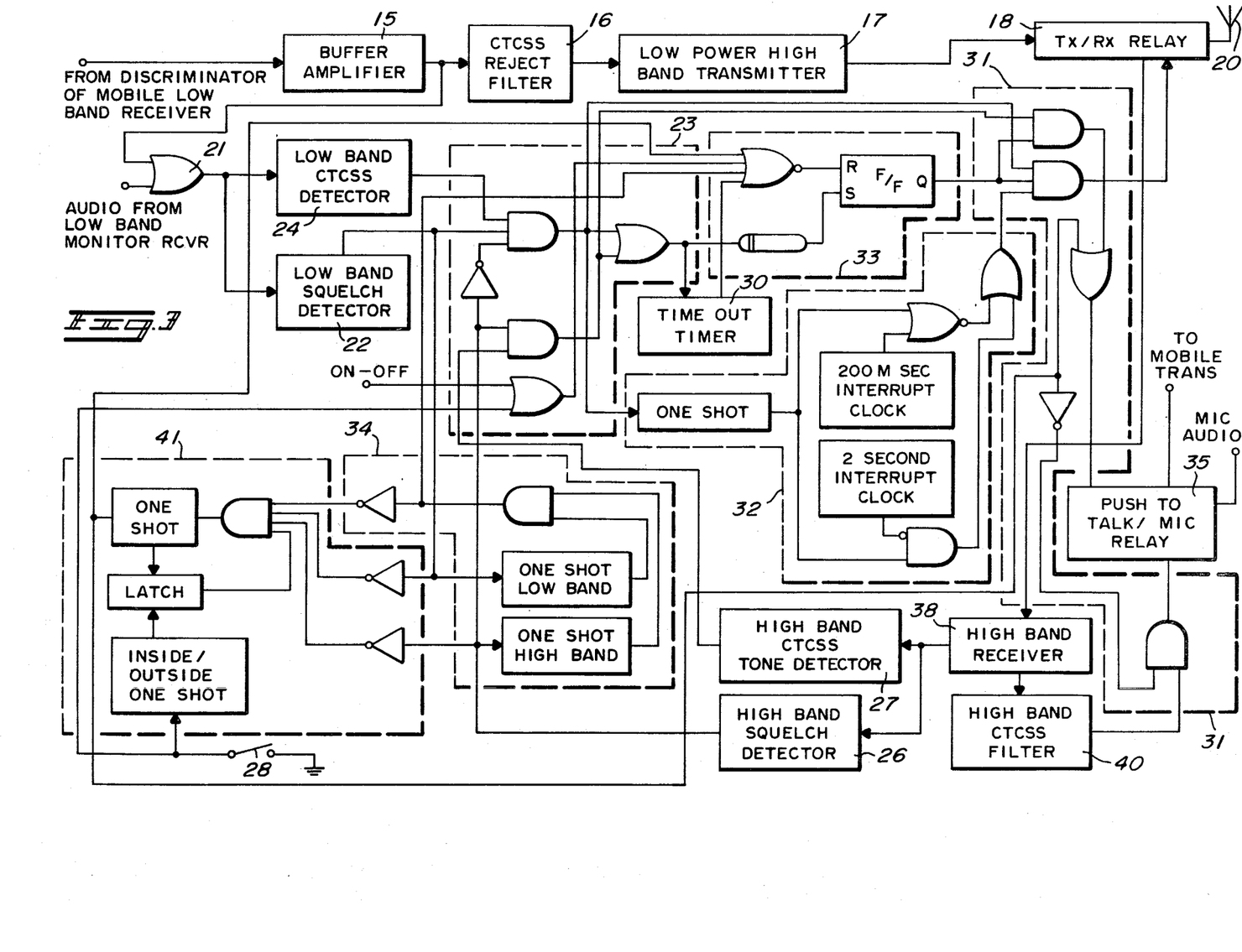
FIG. 3 is a block-schematic diagram as in FIG. 2 with logic details shown.

FIG. 3 is a second diagram covering the repeater of FIG. 2, with logic elements of certain of the blocks disclosed. Since these are standard elements, their functions will not be described.

Figure 4:
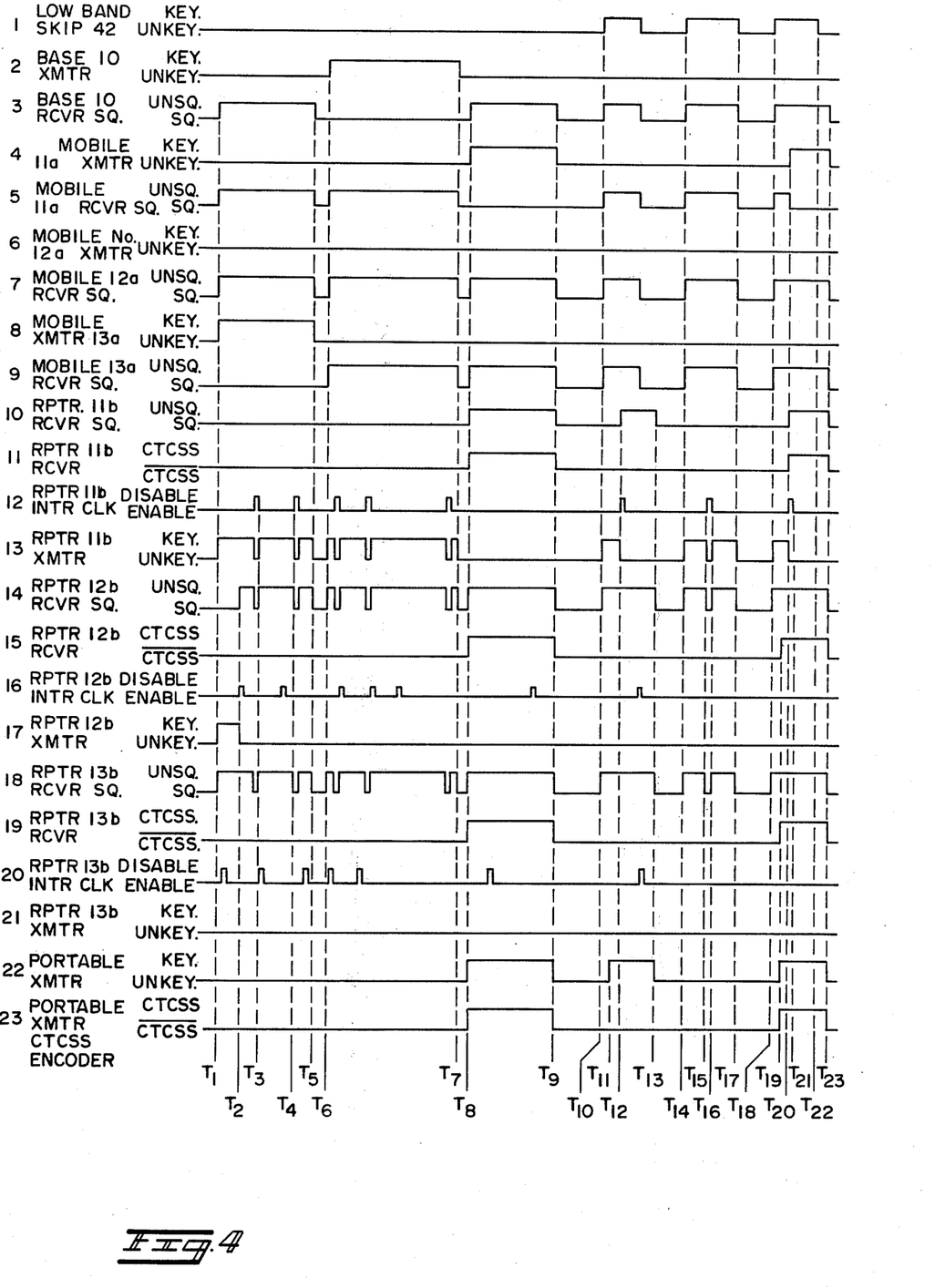
FIG. 4 is a function chart useful in understanding the operation of the system of FIG. 1.

The operation of a repeater according to the invention is best explained in relation to the time chart of FIG. 4 while referring back to FIGS. 1, 2 and 3. The chart plots mode or condition of the various units or sections of units against time for six different operating situations, e.g., line 2 shows that the base transmitter 10 is keyed only between T6 and T7.

The first portion of the chart, from T1 through T5, deals with the situation in which two vehicles, e.g., 11 and 12 are at a location but for one of several possible reasons, no priority unit has been established as yet. This situation could exist if the mobile units 11a, 12a were receiving a base station transmission at the time of the simultaneous arrival at the emergency location and while the portable units 11c, 12c were being detached. The base station transmission would have to cease before the end of the 300 millisecond delay, and no further "repeat" conditions could obtain before T1. Now, at T1, when vehicle 13 arrives at the location there is no transmission on either band and no priority unit. Inside/outside logic circuitry 41 will be enabled at T1 via the switch 28 by removal of the portable unit. Repeater 13b will receive on both channels, but since the mobile receiver will hear nothing, no signal will appear on terminal 14 or on the output of the buffer amplifier 15. The OR gate 21 and LB squelch detector 22 will send a "no signal received" indication to the squelch coincidence detector 34, to logic circuit 41 and to the control logic circuit 23. The HB receiver 38 will also be receiving no transmission through antenna 20 and Tx/Rx relay 18. Thus, HB squelch detector 26 and HB CTCSS detector 27 will also be sending a "no signal received" indication to the control logic circuitry 23. The HB squelch detector 26 also couples this information to the squelch coincidence detector 34 and to the inside/outside logic 41. Since nothing is heard on either channel, repeater 13b assumes that no other repeater is as yet in the priority state of location. This assumption would be made whether, as in the present case, no repeater is actually in priority or, as is more likely, a priority repeater has been established. The control logic circuitry 23 thus does not indicate to the priority state latch and delay 33 that a non-priority delay is required, and neither the interrupt clock 32 or TOT 30 are contraindicating transmission, therefore the switch logic circuitry 31 actuates the Tx/Rx relay 18 to "receive" and the relay 35 to "transmit" for a period of approximately 0.5 seconds. The LB transmitter in mobile 13a (line 8) will be keyed at T1 without audio since no signal is being received by HB receiver 38. During this silent carrier burst, the transmitter 17 (line 21) of the repeater 13b is inhibited, i.e., cannot repeat out on HB the signal that mobile transmitter 13a is transmitting on LB. The base station receiver (line 3) and the receivers of mobile 11a and 12a (lines 5 and 7) will receive the LB transmission and repeaters 11Zb and 12b (lines 13 and 17) will begin to repeat it out on the portable (HB) channel. At T2, the interrupt clock 32 (line 16) of repeater 12b will activate the switch logic circuitry 31, causing the Tx/Rx relay 18 to switch from "transmit" to "receive" for a brief period. This HB listening window is typically 2 milliseconds in length. The period of the block 32 will be described hereinafter. Since repeater 12b will hear (line 14) the HB transmission from repeater 11b, an indication of this reception will be sent by the HB squelch detector 26 in repeater 12b to the control logic circuitry 23 which inhibits repeater 12b from returning to "transmit"mode.

At T3, the interrupt clock 32 (line 12) of repeater 11b causes the Tx/Rx relay of repeater 11b to switch to "receive" for the 2 millisecond listening window, but the HB receiver 38 (line 10) of repeater 11c will not hear any HB transmission. The repeater 11b will then return to "transmit" and continue to transmit until T4 when it will again listen for 2 milliseconds, then return to transmit until the end of the silent burst at T5. The priority state latch 33 of repeater 11b is now latched and repeater 11b is established as the priority unit. Repeaters 12b and 13b will now be in the non-priority state. As explained hereinabove, this means that if repeaters 12b and 13b receive a transmission, they will not repeat it out until after a delay period of approximately 300 milliseconds, and if the priority unit begins repeating out during that delay period, those two repeaters will be inhibited from repeating.

The time between T6 and T7 is a new situation, namely, the local base station transmitter 10 (line 2) now transmits LB. Mobiles 11a, 12a and 13a (lines 5, 7, 9) receive the LB transmission but since repeater 11a has been established as the priority unit, the only HB transmission will come from transmitter 17 of repeater 11c (line 13) and will be received by repeaters 12a and 13a (lines 14, 18) as well as all portables in the area (portable reception not shown). This HB repeating out will continue for the duration of the base transmission, broken only by the 2 millisecond windows which are heard only as clicks in the audio signal.

At T8 a portable (11c, 12c or 13c) begins to transmit (line 22) and since the user wishes to communicate with the base station 10, he activates a CTCSS button (not shown) on his portable thereby adding the CTCSS code to his voice transmission (line 23). This transmission is heard by repeaters 11b, 12b and 13b (lines 10, 14, 18), but since repeater 11b is still in priority, it is the only unit to repeat out. In repeater 11b, the HB squelch detector 26 and the HB CTCSS tone detector 27 will activate the control logic circuitry 23 to maintain the Tx/Rx relay 18 in "receive" (its normal position) and the switch logic 31 will activate the PTT relay 35 to allow mobile 11a (line 4) to transmit on LB the audio from the HB receiver 38 which has had the CTCSS code removed by passing it through the CTCSS filter 40.

In the last three situations on the time chart of FIG. 3 an LB signal (line 1) is "skipping-in" from a base station 42 at another location, perhaps hundreds of miles away. At T10 the skipped signal is received by the base station 10 receiver (line 3), mobile 11a (line 5), mobile 12a (line 7) and mobile 13a (line 9). Repeater 11b, still in priority, begins to transmit on HB (line 13) and continues to transmit until T12 when its interrupt clock 32 (line 12) causes repeater 11b to switch to "receive" on HB. Meanwhile, a portable unit 11c, 12c or 13c has, at T11, begun to transmit HB (line 22) without CTCSS code (line 23), meaning that portable-to-portable communication only is desired. At T12, receiver 38 (line 10) of repeater 11b picks up the HB transmission from the portable and the HB squelch detector inhibits the repeater from further repeating out on HB, but since there is no CTCSS code on the portable transmission, the HB CTCSS tone detector 27 will prevent the information from being repeated out on LB. Thus the "skipped" signal is prevented from interfering with the portable-to-portable transmission which ends at T13.

At T14, a "skipped" signal is again received by all mobiles and repeated out by repeater 11b (line 13) until T15 when its interrupt clock (line 12) switches it from transmit to receive mode, but since there is now no HB transmission to be heard, it returns to transmit until T17, the end of the skipped signal. It should be noted here, that in localities where this occurs very frequently, the system users may choose to use a CTCSS code on LB transmission also. In this case, the LB CTCSS detector 24 and LB CTCSS reject filter 16 would be made a part of the repeater, thus no LB transmission lacking the CTCSS code would be repeated out on HB.

In the sixth situation, a skipped signal from the distant base station 42 is received at T18 and repeating out by priority repeater 11b begins. At T19 a portable begins transmitting HB with CTCSS (lines 22 and 23) meaning that a man on foot wishes to communicate with local base station 10. When repeater 11b is interrupted at T20 it receives the portable transmission. This time, the HB squelch detector 26 inhibits the HB transmitter from further repeating out of the skipped information, but since CTCSS is present (line 11), the portable information will be relayed via the PTT relay 35 to the LB mobile transmitter, and the transmitter enabled. Thus, the skipped signal is prevented from interfering with portable-to-base transmission. The base receiver (line 3) is designed to be captured by the strongest signal, as is well known in the art.

There are three conditions that can cause a repeater to be inhibited while repeating from base to portable:
1. Non-tone encoded transmissions on the portable channel (portable to portable communications).
2. Tone encoded transmissions from the portable channel (portable to base communications).
3. Non-tone encoded transmission on the portable channel (another repeater in the base to portable mode).

In all three cases, the repeater will be inhibited but with condition No. 1, the priority will remain the same. With condition No. 2 the repeater will change from base to portable repeat to a portable to base repeat. This allows the repeater to be controlled by the portable user, especially when undesirable mobile channel (skipped-in) signal is present. It would be desirable to detect a difference between conditions No. 1 and No. 3. By monitoring the sequence and time relationship between the mobile squelch and the portable channel receiver squelch in the squelch coincidence detector 34, this can be reliably done. With condition No. 1, the portable channel squelch will be random when compared to the mobile squelch. With condition No. 3, the portable channel squelch should follow the mobile squelch within a short period of time (say, 100 milliseconds). If this sequence is detected within the specified 100 milliseconds, then another repeater was responsible for the inhibit conditions. The inhibited repeaters will then remove themselves from the priority state.

The interrupt clock 32 has been described above as having a 2 millisecond window or interrupt period, but the length of the interval between windows has been neglected for simplicity. There are, however, several factors to be considered in determining this interval. Any number of repeaters at a single location will require at most two windows to establish a unit in the priority state and it is desirable to have this occur as quickly as possible. However, it is not desirable to have the windows occurring at a rapid rate thereafter, since each one produces a click in the audio. Therefore, in the preferred embodiment, dual period clock 32 may comprise a one shot or monostable multivibrator, one 200 millisecond clock, one 2 second clock and logic elements. The one shot is triggered by the reception of a signal to be transmitted out on either channel, and its unstable state will extend for 0.5 to 0.75 seconds. In this state, it enables the 200 millisecond clock and disables the 2 second clock. Returning to its stable state the one shot disables the 200 millisecond clock and enables the 2 second clock. Thus prioritization, as during T1-T5 can take place quickly (in less than 500 milliseconds), then the clicks are spaced far enough apart (2 seconds) to be unobjectionable.

The inside/outside logic circuitry 41 is activated by a portable unit being inserted into or removed from the vehicle, this function being preferably accomplished by a switch 28 associated with the charging and interconnect socket for the portable. The impulse from the switch activation is lengthened and latched for the amount of time required for the silent carrier burst unless the control logic circuitry 23 prevents the burst due to transmission present on either band.

When a two frequency simplex mobile changes to a second LB transmission channel, the switch 28 would be activated just as it was when the portable was removed from the vehicle. Therefore, if that unit is in priority, it will leave the priority state and transmit a silent burst. One of the remaining units will then become the priority unit. On the new channel, the former priority unit will be in the non-priority or delayed state, but if there is no other unit already in priority on the second frequency, that unit will transmit as required (after the 300 millisecond delay), then become the priority unit.

Thus, the maximum delay before repeating out has been reduced, interference between repeaters has been essentially eliminated, priority generally stays with the first vehicle to arrive on the emergency scene, and precedence is given to portable transmission.

It is to be understood that the means of prioritizing could as well be applied to the mobile units only, or to both mobile and repeater units if desired.

Other modifications may be made within the spirit of the invention and it is desired to cover all such modifications which fall within the scope of the appended claims.

What is claimed is:
1. In a two-way communication system having a base station operating on a first frequency, and a plurality of vehicular installations each comprised of a mobile station operating on the first frequency, a detachable portable unit operable on a second frequency and a repeater unit for repeating out on one of said frequencies information received on the other of said frequencies, apparatus for prioritizing the repeater operation, including in combination:
first detect means for detecting received transmissions on the first frequency;
second detect means for detecting received transmissions on the second frequency;

switching means for activating one of the receive and transmit functions at the second frequency;

means coupled to the switching means for providing momentary interrupt periods in the repeater function when repeating out on the second frequency;

latching means coupled to the switching means for enabling the repeater function;

first circuit means coupled to the first and second detect means to the latching means for delatching the latching means when substantially simultaneous transmissions are received on the first and second frequencies during at least one of said interrupt periods;

delay means for relatching the latching means a predetermined period of time after the detection of received transmission;

second circuit means for disenabling repeating out on the second frequency when transmission is received on the second frequency during at least one of said interrupt periods.

2. Prioritizing apparatus as described in claim 1 and further including a time out timer for delatching the latching means after a predetermined period of uninterrupted transmission.

3. Prioritizing apparatus as described in claim 1 and further including third circuit means for delatching the latching means when the portable unit is inserted or detached from the vehicular installation.

4. Prioritizing apparatus as described in claim 2 and further including fourth circuit means for enabling a brief transmission on the first frequency if no transmissions are being received when the portable unit is inserted or detached from the vehiclular installation.

5. Prioritizing apparatus as described in claim 1 and wherein the interrupt means comprises a one shot multivibrator and a plurality of clock means for providing interrupt periods having a first spacing during a first interval after the beginning of a period of repeating out on the second frequency, followed by interrupt periods having a second spacing, the latter continuing until the end of said second frequency repeating out.

6. Prioritizing apparatus as described in claim 1 and further including third detecting means for sensing a predetermined code signal superimposed on a received second frequency transmission, and wherein the second delatching circuit means further includes means for enabling repeating out on the first frequency only when the predetermined code signal is present on the received second frequency signal.

7. A prioritized two-way communication system, the system including a base station for receiving and transmitting at a first frequency, a plurality of mobile units for receiving and transmitting at the first frequency, a portable unit associated with each one of the mobile units and adapted to receive and transmit at a second frequency when the portable unit is separated from the mobile unit, and a repeater unit coupled to each one of the mobile units, the repeater unit comprising:

circuit means for receiving signals at the second frequency;

circuit means for transmitting signals at the second frequency;

antenna means;

first switch means for selectively coupling the antenna means to one of the second frequency receiving and transmitting means;

second switch means for selectively coupling the receiving circuit means to the mobile transmitter;

clock circuitry;

first detector means responsive to the reception by the associated mobile unit of signals at the first frequency;

second detector means coupled to the receiving circuit means and responsive to the reception by the receiving circuit means of signals at the second frequency;

third detector means coupled to the receiving circuit means and responsive to a predetermined signal associated with received second frequency signals;

first logic circuitry for providing an output in response to the connection and separation of the portable unit and the mobile unit;

second logic circuitry for providing a first output at a first output terminal in response to the output of the first and second detector means, a second output at a second output terminal in response to the outputs of the second and third detector means, and a third output at a third output terminal in response to the outputs of the first, second and third detector means;

prioritizing means coupled to the output of the first logic circuitry and to the third output terminal of the second logic circuitry for enabling transmission by the mobile unit and the second frequency transmission means; and third logic circuitry coupled to the outputs of the first logic circuitry, the first output terminal of the second logic circuitry, the clock circuitry, and the prioritizing means for activating the first switch means and the second switch means.

8. A prioritized two-way communication system according to claim 7 wherein the first switching means includes a transmit/receive relay.

9. A prioritized two-way communication system according to claim 7 wherein the second switching means includes a push-to-talk button and a relay.

10. A prioritized two-way communication system according to claim 7 wherein the clock means provides signals at predetermined times for activating the first switching means.

11. A prioritized two-way communication system according to claim 10 wherein the clock means is responsive to an output of the second logic circuitry.

12. A prioritized two-way communication system according to claim 10 wherein the clock means comprises a monostable multivibrator, two clocks and at least one logic element for providing signals having a first spacing for a predetermined period of time and signals having a second spacing after the predetermined period of time.

13. A prioritized two-way communication system according to claim 7 wherein the first detector means comprises a squelch detector circuit.

14. A prioritized two-way communication system according to claim 7 wherein the second detector means comprises a squelch detector circuit.

15. A prioritized two-way communication system according to claim 7 wherein the transmissions at the second frequency may include a predetermined signal and wherein the third detector means comprises circuit means responsive to the presence of the predetermined signal.

16. A prioritized two-way communication system according to claim 7 and further comprising socket means associated with the mobile unit for releasably receiving the portable unit therein, and the first logic circuitry includes switch means positioned for activation by the connection and separation of the portable unit and the socket of the mobile unit.

17. A prioritized two-way communication system according to claim 16 wherein the third logic circuitry comprises means for selectively activating the second switching means for one of a multiplicity of operating modes, said multiplicity including a silent transmission load.

18. A prioritized two-way communication system according to claim 17 wherein the first logic circuitry comprises latching and timing means, and is responsive to the outputs of the first detector means and the second detector means whereby the output of the first logic circuitry enables the second switching means for a period of silent transmission.

19. A prioritized two-way communication system according to claim 7 wherein the prioritizing means comprises a delay means coupled to an output of the second logic circuitry, latching means, and logic means coupled for delatching the latching means.

20. A prioritized two-way communication system according to claim 7 and further including a time out timer for disabling the first and second switching means.

21. A prioritized two-way communication system according to claim 20 wherein the time out timer is coupled between an output of the second logic circuitry and the prioritizing means and includes a timing means for delatching the latching means following a predetermined period of continued transmission from one of the mobile and repeater units.

22. A prioritized two-way communication system according to claim 7 and further including fourth detector means responsive to the first and second detector means and coupled to delatch the latching means when the outputs of the first and second detector means indicate nearly simultaneous transmission endings.

23. A prioritized two-way communication system according to claim 7 wherein the transmissions at the first frequency may include a second predetermined signal and further including first detector means comprising circuit means responsive to the presence of the second predetermined signal.

* * * * *